Sept. 8, 1970           R. D. ROBERTS           3,527,322

LUBRICANT DISTRIBUTOR CONTROL MEANS

Filed Aug. 14, 1968

INVENTOR
ROBERT D. ROBERTS
BY
McNENNY, FARRINGTON, PEARNE, & GORDON

ATTORNEYS

United States Patent Office 3,527,322
Patented Sept. 8, 1970

3,527,322
LUBRICANT DISTRIBUTOR CONTROL MEANS
Robert D. Roberts, Streetsboro, Ohio, assignor to
Houdaille Industries, Inc., a corporation of Delaware
Filed Aug. 14, 1968, Ser. No. 752,572
Int. Cl. F16n 29/02
U.S. Cl. 184—6       3 Claims

ABSTRACT OF THE DISCLOSURE

A control and monitoring system for initiating the operation of at least one cyclic type lubricant distributor having a plurality of plungers each of which travels back and forth once in the course of each cycle of operation of the distributor and for signaling the incompletion of an operating cycle within a timed interval. The control and monitoring system includes first and second timers whose timing periods are respectively relatively short and long, and whose input signals are timed respectively in their "on" and "off" states. When the second timer times out, the timing function of the first timer is initiated and the lubrication system is turned on to initiate the operating cycle period. The second timer is reset during the operating cycle and when the operating cycle is completed, the system is turned off, the first timer is reset, and the second timer begins its timing function. If the cycle is not completed, the first timer times out and operates a trouble indicating means.

BACKGROUND OF THE INVENTION

This invention relates to flow-responsive, automatically controlled lubricating systems, particularly those which include a cyclic type distributor or distributors. Such cyclic distributors include distributors of the type shown, for example, in U.S. Pat. Nos. 21,236; 2,718,281; 2,792,-911; 2,834,433; 3,025,929; and 3,074,509, in which lubricant is received in a single main inlet of the distributor and is discharged in endless predetermined sequence through a number of outlets to a number of branch lines, the distributor having a plurality of plungers each of which travels back and forth once in the course of each cycle of operation of the distributor.

It has been proposed in connection with lubricant systems employing cyclic type distributors that means be provided for turning on a lubricant feeding means upon initiation of the active phase of a control system which establishes active and quiescent phases, a means for thereafter turning off the lubricant feeding means upon the desired amount of cycling of a lubricant distributor, and indicator means responsive only to a sequence in which the desired amount of cycling is completed during the active phase established by the control system. This prior proposal is set forth in Callahan et al., Pat. 3,127,954. In accordance with one aspect of the teachings of Pat. 3,127,954, a pin-type timer is provided which establishes active and quiescent phases of a lubrication cycle. The active phase is relatively short as compared to the quiescent phase, and when the active phase of the lubrication cycle is established, the lubricant feeding means is turned on and is thereafter turned off upon completion of a full cycle of the lubricant distributor. Switches are provided which will actuate a warning means in the event that the active phase terminates prior to the completion of a lubricant distributor cycle.

SUMMARY OF THE INVENTION

According to this invention, a control means is provided for a lubrication system. The control means is a simplified yet highly reliable control which establishes relatively long quiescent and relatively short active lubrication phases. The control means operates a signal which indicates normal cycling if such cycling is completed during the established active phase or operates a warning signal if normal cycling is not completed during the active phase.

The control means according to the present invention includes first and second timers having respectively relatively short and long timing periods. The second timer establishes the quiescent phase and when the second timer times out, the timing function of the first timer is initiated. When the timing function of the first timer is initiated, the lubricating system begins its operating cycle and upon completion of a normal operating cycle within the active phase established by the first timer, a normal operating signal is maintained. If, however, a cycle is not completed by the distributor within the established active phase, the first timer times out and actuates a trouble indicating means. Timing out of the first timer is, therefore, prevented by completion of a normal lubricating cycle and, upon such completion, the first timer is reset and the second timer begins its quiescent phase timing cycle.

The present invention employs a pair of timers instead of a single timer, but it employs them in such a way as to effect considerable net savings over the systems of the prior art by elimination of latching and electromechanical relays, reduction of material costs due to the smaller size of the control unit, and reduction of labor costs because of considerable reduction of number of wiring connections.

DETAILED DESCRIPTION OF THE DRAWING

Figure 1:
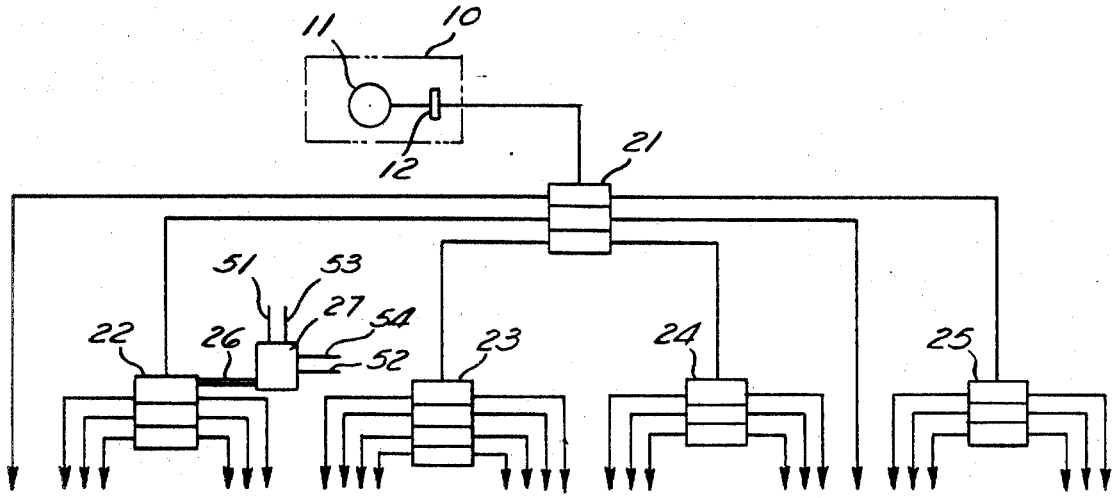
FIG. 1 is a diagrammatic view of a lubrication system with which the invention may be used.

The lubricating system illustrated in FIG. 1 supplies lubricant to several stations, indicated by the arrows, at the downstream ends of the branch lines and proportions the supply of the lubricant between the several stations from a lubricant feeding means 10 which may itself include a pump 11 actuated by a pressure-responsive switch or the like supplied from a reservoir (not shown). Turning on and off the lubricant supply may consist merely in turning off the pump 11. Alternatively, the pump or other fluid supply or pressure-maintaining means may constantly run to afford a pressure supply head, and a solenoid-operated valve 12 in the lubricant supply line may be opened and closed to turn on and off the lubricant feed to the system.

In some systems, there may be no constant pressure source, such as the pump 11, but instead there may be a single cycle air-driven pump which shuts down after each cycle of operation. If the unit 11 is regarded as such an air-driven pump rather than an electrically-powered pump, then the means for turning on and off the cycle comprises an air solenoid controlled by a pulsing switch which, when provided with electrical power, turns on and off at an appropriate frequency, thereby turning on and off the air supply lines to the air motor of the pump 11 in such a manner as to cause it to constantly recycle so that in effect it is operating as a constantly running motor to constantly supply lubricant to the distribution system until such time as the power to the pulsing switch is discontinued, thereby shutting off the air solenoid. Thus, it will be understood that the lubricant feeding means may comprise an electric pump, a solenoid-controlled lubricant valve between the lubrication network and a pressure source, an air-driven pump which is recycled by the successively occurring on and off conditions of an air solenoid between the pump and a pressure source, or other equivalent lubricant feeding means.

Associated with the lubrication system are a number of distributors 21, 22, 23, 24, and 25. The distributor 21 will be seen to comprise a main distributor and the distributors 22–25 will be seen to comprise subsidiary distributors. These are cyclic type distributors as described, for example, in any of the foregoing patents.

One of the blocks of the subsidiary distributor 22 is provided with a protruding plunger extension element 26 in the same manner as illustrated, for example, in U.S. Pat. No. 2,834,433, at 2d, except that the extension element 26 is adapted to actuate a switch 27.

Figure 2:
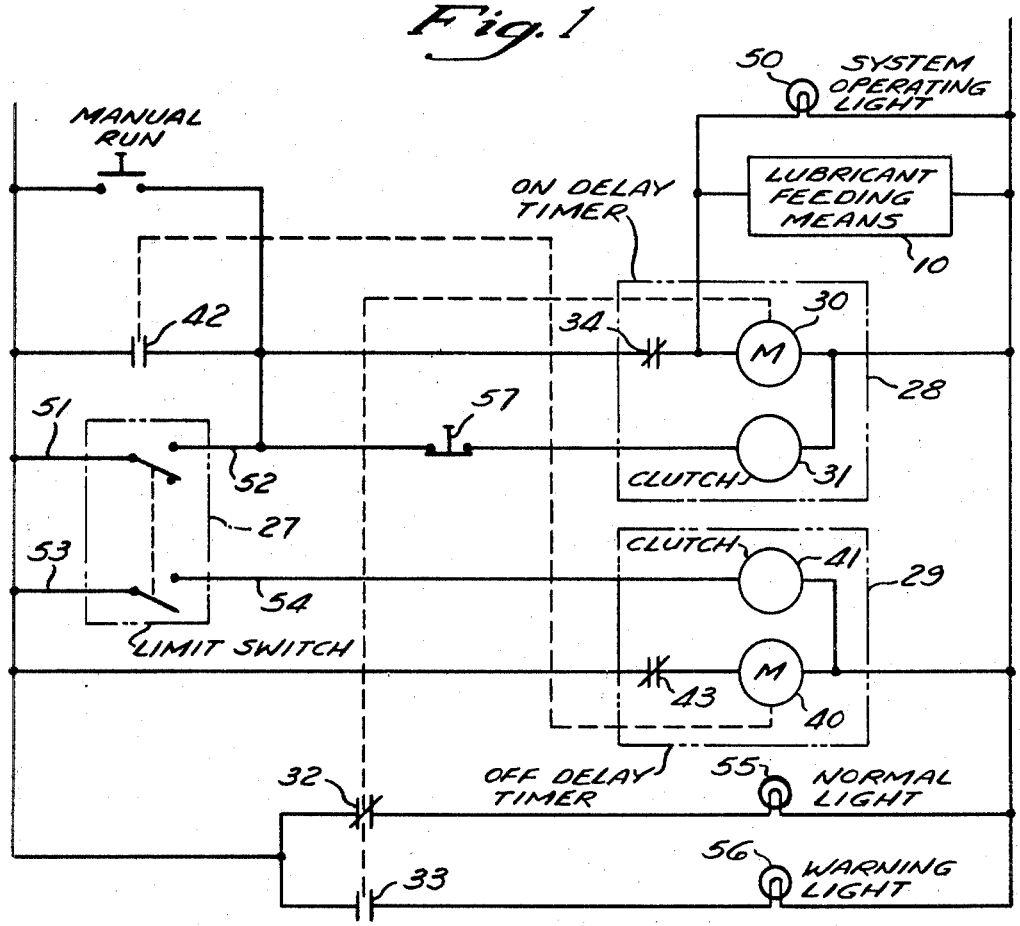
FIG. 2 is a diagrammatic representation of a control system contemplated by the invention and used in association with the system shown in FIG. 1.

In FIG. 2, there is illustrated a circuit for controlling and monitoring the lubrication system illustrated in FIG. 1. The control and monitoring system includes first and second timer means having, respectively, relatively short and long timing periods. In the illustrated embodiment, the first timer comprises an "on-delay" timer 28 and the second timer comprises an "off-delay" timer 29.

The timed state of the input signal of one timer is the "on" state and that of the other timer the "off" state. Since "on" and "off" are complementary states, it will be understood that the timed states of the input signals of the first and second timers are complementary to each other.

The timers 28 and 29 may be conventional units such as those produced by Automatic Timing and Controls, Inc., King of Prussia, Pa. The "on-delay" timer includes a synchronous motor 30 and a tooth clutch 31. When the clutch 31 and the motor 30 are energized, the motor 30 drives the clutch 31 for a time period which is predetermined and which may be set by the user. For a typical operation, the "on-delay" timer may be set for a time period of ten minutes. A constant rise cam (not shown) integral with a portion of the tooth clutch is rotated and, at the end of the dial-set time, a normally closed switch 32 is opened and a normally open switch 33 is closed. When the power is removed from the clutch 31, the clutch disengages and a reset spring (not shown) returns the constant rise cam to its start position, thus preparing the "on-delay" timer for its next cycle.

The "off-delay" timer 29 includes a synchronous motor 40 and a tooth clutch 41. The "off-delay" timer 29 may be set for a predetermined time interval. A typical timing interval may be, for example, 60 minutes. The "off-delay" timer begins its timing operation when the power to the clutch is turned off, i.e., the clutch is engaged when it is de-energized. When the "off-delay" timer 29 completes its timing operation, a normally open switch 42 is closed. When the clutch 41 is energized, the "off-delay" timer 29 resets and the switch 42 is returned to its normally open condition.

The control device shown in FIG. 2 is in its quiescent state, with the motor 40 of the "off-delay" timer 29 running, since the motor 40 is in a circuit established through a normally closed switch 43. When the "off-delay" timer times out, thus ending the quiescent phase, the normally open switch 42 is closed and the clutch 31 is energized and the motor 30 is energized through a normally closed switch 34.

Provided in parallel with the "on-delay" timer 28 is the lubricant feeding means 10 and a system operating light 50.

The operation of the lubricant feeding means 10 causes lubricant to be distributed throughout the system. At a certain stage in this process, the element 26 (FIG. 1) on the distributor 22 will shift through an operating cycle through first and then second extremes of movement within a timed interval if the system is operating properly. There is provided means responsive to progression of the element 26 to a first point in its operating cycle, e.g., a fully extended position with respect to the distributor 22. The switch 27 is responsive to such progression to connect a lead 51 to a lead 52 and to connect a lead 53 to a lead 54. When the lead 53 is connected to the lead 54, the clutch 41 of the "off-delay" timer 29 is energized, thus resetting the "off-delay" timer 29 and opening the switch 42. Even though the switch 42 is opened when the clutch 41 is energized, the motor 30 and the clutch 31 remain energized, since the lead 51 is connected to the lead 52. The connection between the leads 51 and 52 is maintained until the element 26 returns to its operating cycle starting position. When the element 26 returns to its operating cycle starting position. When the element 26 returns to its initial position, thus signaling the end of an operating cycle, the switch 27 is returned to its illustrated position.

When the leads 51 and 52 are dsconnected, the motor 30 and the clutch 31 are de-energized, the lubricant feeding means 10 is de-energized, and the system operating light 50 is turned off. If this cycle is completed within the preselected time period of the "on-delay" timer 28, the normally closed switch 32 remains closed, and the normally open switch 33 remains open and a normal light 55 remains energized through the switch 32. The timer 28 returns to its starting position for its next cycle of operation.

When the lead 53 is disconnected from the lead 54, the clutch 41 of the "off-delay" timer is de-energized and the "off-delay" timer begins its quiescent phase timing operation.

If the leads 51–54 remain connected after the "on-delay" timer times out, however, the switch 32 is opened and the switch 33 is closed and a warning light 56 is turned on to indicate an incomplete lubricating cycle. Thus, the element 26 must complete a complete operating cycle within the preset time period of the "on-delay" timer to avoid a warning indication.

If a lubrication fault occurs and after the problem is corrected, the "on-delay" timer may be reset by opening a reset switch 57.

In order to stop the timer drive after timing out, the timers 28 and 29 may be provided with the normally closed switches 34 and 43, respectively. When the "off-delay" timer 29 times out, the switch 43 opens and remains open until the timer is reset.

If the "on-delay" timer 28 times out, the normally closed switch 34 opens and remains open until the timer is reset. Opening the switch 34 also de-energizes the lubricant feeding means.

The invention is not restricted to the slavish imitation of each and every one of the details described above, which have been set forth merely by way of example with the intent of most clearly setting forth the teaching of the invention. Obviously, specific structural details may be changed or eliminated without departing from the invention.

What is claimed is:

1. In a flow-responsive automatically controlled lubrication system comprising at least one cyclic type lubricant distributor having a plurality of plungers each of which travels back and forth once in the course of each cycle of operation of the distributor, in combination therewith the improvement which comprises a control and monitoring system for causing a plunger to shift through an operating cycle through first and then second extremes of movement within a timed interval or else signaling the inability to cause such performance, first and second timer means having respectively relatively short and long timing periods, means responsive to timing out of said second timer for (1) initiating timing of said first timer means and (2) initiating drive of said plunger in an operating cycle, means for resetting said second timer means and responsive to progression of said plunger to a first point in its operating cycle, means responsive to a progression of said plunger to a second more advanced point in its operating cycle for (1) discontinuing said drive of said plunger in its operating cycle, (2) resetting said first timer means, and (3) initiating timing of said second timer means, and trouble-indicating means responsive to timing-out of said first timer means.

2. In a flow-responsive automatically controlled lubrication system comprising at least one cyclic type lubricant distributor having a plurality of plungers each of which travels back and forth once in the course of each cycle of operation of the distributor, in combination therewith the improvement which comprises a control and monitoring system for causing a plunger to shift through an operating cycle through first and then second extremes of movement within a timed interval or else signaling the inability to cause such performance, first timer means for timing-out after a first adjustable characteristic interval of uninterrupted time state of its input signal but resetting upon interruption of the input signal's timed state, second timer means for timing-out after a second adjustable characteristic interval of uninterrupted time state of its input signal but resetting upon interruption of the input signal's timed state, the timed states of he input signals of the first and second timers being complementary to each other, mechanical electrical switch means having a first positional state associated with movement of a plunger, away from said second extreme position back toward its first position and a second positional state associated with movement of said plunger toward or unto its said second extreme position, means for establishing the timed state of the input signal of the first timer in response to either (1) a condition where the second timer has timed-out and has not yet reset or (2) existence of said second positional state of said mechanical electrical-switch means, and for interrupting the timed state of the input signal of the first timer upon the cessation of both said conditions, means for maintaining the timed state of the input signal of the second timer during said first positional state of said mechanical electrical-switch means, means for powering said plunger for said shifting movement through its operating cycle while the input signal of the first timer is in its timed state, warning means responsive to timing out of said first timer means.

3. In a flow-responsive automatically controlled lubrication system comprising at least one cyclic type lubricant distributor having a plurality of plungers each of which travels back and forth once in the course of each cycle of operation of the distributor, in combination therewith the improvement which comprises a control and monitoring system for causing a plunger to shift through an operating cycle, first and second timer means, the timing phase of said first timer means and the drive of said plunger in an operating cycle being initiated by the completion of the timing phase of said second timer means, said first timer (1) being reset upon completion of a full plunger cycle prior to the completion of its timing phase or (2) timing out upon non-completion of a full plunger cycle within its timing phase, and warning means responsive to timing out of said first timer means but not responsive to reset prior to timing out.

References Cited
UNITED STATES PATENTS

| | | | |
|---|---|---|---|
| 2,834,433 | 5/1958 | Higgens | 184—7 |
| 3,025,929 | 3/1962 | Robson et al. | 184—7 |
| 3,074,509 | 1/1963 | Robson | 184—7 |
| 3,127,954 | 4/1964 | Callahan et al. | 184—7 |
| 3,381,776 | 5/1968 | Gruber et al. | 184—7 XR |

MANUEL A. ANTONAKAS, Primary Examiner

U.S. Cl. X.R.

184—7; 340—270